US011757314B2

(12) United States Patent
Robert et al.

(10) Patent No.: US 11,757,314 B2
(45) Date of Patent: Sep. 12, 2023

(54) SYSTEMS AND METHODS FOR CHARGING A BATTERY IN A MOBILE ROBOT

(71) Applicant: Ford Global Technologies, LLC, Dearborn, MI (US)

(72) Inventors: Brian Robert, Saint Clair Shores, MI (US); Kent Snyder, Dearborn, MI (US); Raj Sohmshetty, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 31 days.

(21) Appl. No.: 17/162,969

(22) Filed: Jan. 29, 2021

(65) Prior Publication Data

US 2022/0247241 A1 Aug. 4, 2022

(51) Int. Cl.
*H02J 50/90* (2016.01)
*B60L 53/12* (2019.01)
*H02J 50/12* (2016.01)

(52) U.S. Cl.
CPC ............. *H02J 50/90* (2016.02); *B60L 53/12* (2019.02); *H02J 50/12* (2016.02)

(58) Field of Classification Search
CPC ...................................................... H02J 50/90
See application file for complete search history.

(56) References Cited

U.S. PATENT DOCUMENTS

| 8,030,888 | B2 | 10/2011 | Pandya et al. | |
|---|---|---|---|---|
| 9,409,490 | B2 | 8/2016 | Kawashima | |
| 10,040,360 | B1 | 8/2018 | Long et al. | |
| 2014/0361735 | A1* | 12/2014 | Li | H02J 50/12 320/108 |
| 2015/0073642 | A1* | 3/2015 | Widmer | G01C 21/3635 701/22 |

(Continued)

FOREIGN PATENT DOCUMENTS

CN 105529760 A 4/2016

OTHER PUBLICATIONS

Lingbing Gong et al, "Adaptive Smart Control Method for Electric Vehicle Wireless Charging System", MDPI Energies, MDPI, Basel, Switzerland, Oct. 9, 2018, 13 pages.

*Primary Examiner* — Daniel Kessie
(74) *Attorney, Agent, or Firm* — Brandon Hicks; Eversheds Sutherland (US) LLP (57) ABSTRACT

This disclosure is generally directed to systems and methods for wirelessly charging a battery in a mobile robot. In an example method in accordance with the disclosure, a mobile robot locates and approaches a wireless battery charging station (by using an onboard camera, for example). The mobile robot then executes an alignment procedure to align a wireless charge receiving pad of the mobile robot with a battery charging pad of the wireless battery charging station. The alignment procedure may involve the mobile robot moving the wireless charge receiving pad in any of three axial directions, such as, backwards, forwards, sideways, upwards, and/or downwards. After alignment is completed, the mobile robot may establish a wireless handshake with the wireless battery charging station. The wireless handshake can include a verification of an authentication of the mobile robot to access the wireless battery charging station, followed by a wireless battery charging operation.

19 Claims, 6 Drawing Sheets

(56) References Cited

U.S. PATENT DOCUMENTS

2017/0135490 A1* 5/2017 Andrix ................. A47C 21/048
2018/0083669 A1* 3/2018 Jeong ...................... H02J 50/90
2019/0315240 A1* 10/2019 Wu ......................... B60L 53/35

* cited by examiner

SYSTEMS AND METHODS FOR CHARGING A BATTERY IN A MOBILE ROBOT

BACKGROUND

Various types of robots are being deployed in a wide variety of environments and applications. Some of these robots are stationary robots, such as industrial robots in a manufacturing line, while others are mobile robots that can move around, such as unmanned aerial vehicles and terrestrial robots. Terrestrial robots can perform a variety of tasks, including transporting objects in an industrial environment, executing military objectives in a battlefield, assisting search operations in a disaster situation, and delivering packages to consumers. Applications related to the use of mobile robots for delivering packages to consumers is generally referred to as last mile delivery applications.

Last mile delivery applications are typically executed autonomously by mobile robots using onboard computer systems and batteries provided in the mobile robots. In some cases, the batteries are recharged manually by a person who may plug an electrical cord of the mobile robot into a wall socket. In some other cases, the batteries may be charged autonomously by the mobile robot (e.g., a robotic vacuum cleaner that moves into a docking station to charge an onboard battery.) However, many mobile robots have shapes and sizes that are significantly different in comparison, thereby leading to several challenges and obstacles that have to be addressed in connection with battery charging operations.

One challenge that may be associated with a wireless battery charging operation is optimizing power transfer from a wireless battery charging unit into a battery of a mobile robot. Optimizing power transfer involves various alignment procedures to be carried out by the mobile robot. Such procedures may be relatively straightforward when executed by a human being who can manipulate the mobile robot to obtain a satisfactory level of power transfer. However, a mobile robot may lack the ability to execute such an operation autonomously without human assistance.

It is therefore desirable to provide solutions that address at least some shortcomings in conventional procedures for charging a battery of a mobile robot in an autonomous manner.

BRIEF DESCRIPTION OF THE DRAWINGS

A detailed description is set forth below with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

In terms of a general overview, certain embodiments described in this disclosure are directed to systems and methods for wirelessly charging a battery in a mobile robot. In an example method, a mobile robot locates a wireless battery charging station (by using an onboard camera, for example). The mobile robot then approaches the wireless battery charging station and executes an alignment procedure to align a wireless charge receiving pad of the mobile robot with a battery charging pad of the wireless battery charging station. The alignment procedure may involve the mobile robot moving the wireless charge receiving pad in one or more of three axial directions, such as, for example, backwards, forwards, sideways, upwards, and/or downwards. The alignment procedure may also include a peak power detection routine for optimizing wireless power transfer from the battery charging pad of the wireless battery charging station to the wireless charge receiving pad of the mobile robot. After alignment is completed, the mobile robot may establish a wireless handshake with the wireless battery charging station. An example operation that may be associated with the wireless handshake is a verification of an authentication of the mobile robot to access the wireless battery charging station. A wireless battery charging operation may then be executed, subject to validation of the authentication.

Illustrative Embodiments

The disclosure will be described more fully hereinafter with reference to the accompanying drawings, in which example embodiments of the disclosure are shown. This disclosure may, however, be embodied in many different forms and should not be construed as limited to the example embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the above-described example embodiments but should be defined only in accordance with the following claims and their equivalents. The description below has been presented for the purposes of illustration and is not intended to be exhaustive or to be limited to the precise form disclosed. It should be understood that alternate implementations may be used in any combination desired to form additional hybrid implementations of the present disclosure. For example, any of the functionality described with respect to a particular device or component may be performed by another device or component. Furthermore, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments.

Certain words and phrases are used herein solely for convenience and such words, terms, and labels should be interpreted as referring to various objects and actions that are generally understood in various forms and equivalencies by persons of ordinary skill in the art. For example, the label "mobile robot" as used in this disclosure encompasses any of various types of robots that may move autonomously or semi-autonomously. A few examples of such mobile robots can include delivery robots used for last mile delivery services, terrestrial robots used in consumer applications, terrestrial robots used in industrial applications, helper robots that can move around carrying objects (in a warehouse, a store, a warehouse etc.) and/or assisting customers, and may also include some types of autonomous vehicles such as Level 4 (L4) vehicles and Level 5 (L5) vehicles. Phrases "wireless battery charging station" and "wireless battery charging apparatus" may be used interchangeably and generally refer to a charging apparatus that transmits an electric charge wirelessly. The electric charge may be received in a "wireless charge receiving pad" of a mobile robot and used to charge a rechargeable battery provided in the mobile robot. The word "wireless' as used herein encompasses any of various types of signals that can be used to provide a wireless charge to a battery, including radio-frequency (RF) signals, low-frequency signals, and optical signals. Communications may include identification (e.g. locating charging pads for Tx and Rx (optical, laser, RFID, etc.) and signals to initiate and control charging (e.g. verification "handshake" (BlueTooth, WiFi, radio and other frequencies). Separately, methods for wireless power transfer may include inductive coupling, magnetic resonance coupling, RF radiation, and so on. The word "example" as used herein is intended to be non-exclusionary and non-limiting in nature.

Figure 1:
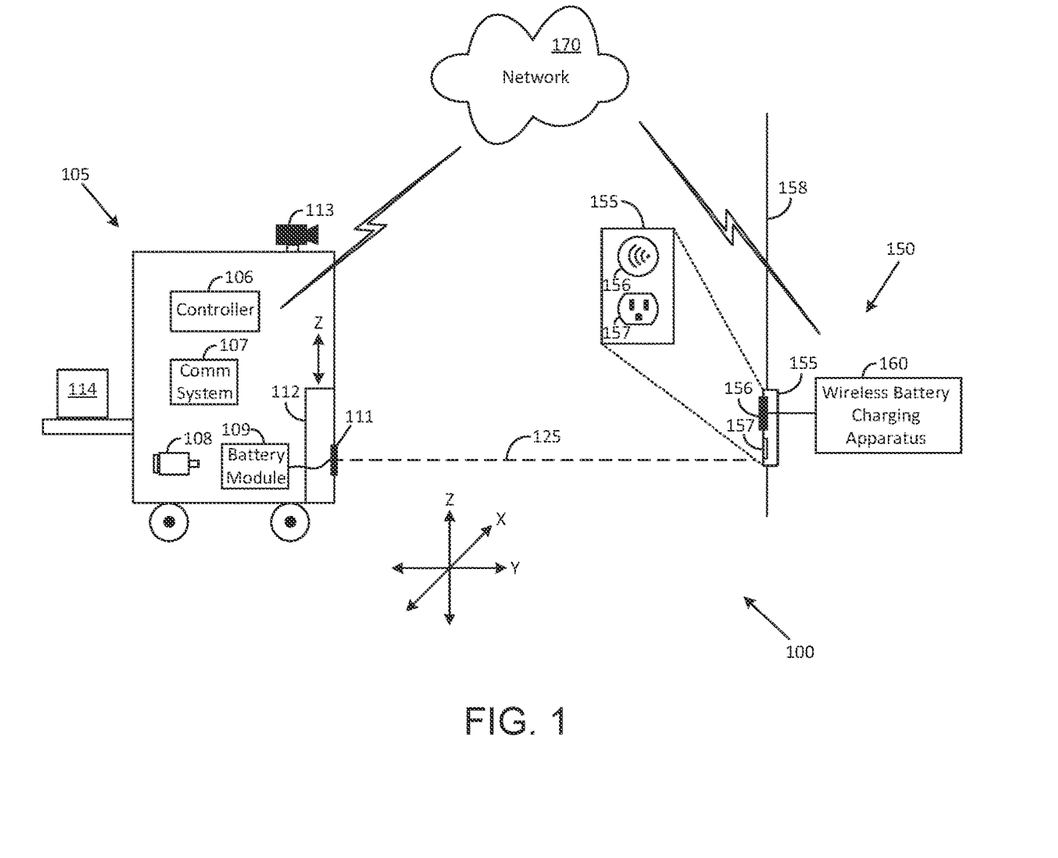
FIG. 1 shows an example system that includes a mobile robot and a stationary wireless battery charging station in accordance with an embodiment of the disclosure.

FIG. 1 shows an example system 100 that includes a mobile robot 105 and a stationary wireless battery charging station 150 in accordance with an embodiment of the disclosure. In this example embodiment, the mobile robot 105 is a terrestrial robot that can move around autonomously without human intervention in order to deliver one or more packages (such as, for example, a package 114) in a last mile application, a warehouse application, and/or an industrial application. In other embodiments, the mobile robot 105 can be any other type of autonomous robot that is capable of moving around on the ground, including some types of airborne robots and multifunctional robots. An airborne robot may include wheels or tracks that allow the airborne robot to move around on the ground. A multifunction robot can travel on a ground surface and can fly over obstacles as well.

The mobile robot 105 may include components such as, for example, a controller 106, a communication system 107, a motor system 108, an onboard camera 113, and a battery module 109. The controller 106 may control various operations of the mobile robot 105, such as, for example, delivery operations associated with the package 114, battery recharging operations, and communication operations. The operations may involve, for example, receiving instructions via the communication system 107, transmitting information via the communication system 107, identifying a drop-off location, moving to the drop-off location, and dropping off the package 114 at the drop-off location. The controller 106 may further control certain operations executed by the motor system 108. The motor system 108 can include one or more motors that are coupled to various members of the mobile robot 105, such as, for example, a lifting/carrying platform for carrying the package 114 and wheels for enabling the mobile robot 105 to move around in various directions.

The battery module 109 can include one or more rechargeable batteries and can further include battery charge level detection circuitry that is communicatively coupled to the controller 106. The controller 106 may use information provided by the battery charge level detection circuitry to perform actions such as, for example, to make a determination about recharging the battery module 109 (for example, when the battery charge level drops below a threshold level) and charging the battery module 109 pre-emptively (so as to avoid running out of a battery charge while executing a delivery operation of the package 114). The battery module 109 is coupled to a wireless charge receiving pad 111 that may be provided on an external surface of a compartment 112 of the mobile robot 105.

In this example embodiment, the compartment 112 can move upwards or downwards along a z-axis, under control of the controller 106. This arrangement allows the controller 106 to move the wireless charge receiving pad 111 upwards or downwards in order to modify an elevation of a horizontal axis 125 of the wireless charge receiving pad 111. In an example method of operation in accordance with disclosure, the mobile robot 105 may move along the ground (x-y plane), from a current location to a spot located adjacent to a battery charging pad 156 of the stationary wireless battery charging station 150. The controller 106 may then move the compartment 112 upwards or downwards along the z-axis so as to align the wireless charge receiving pad 111 with the battery charging pad 156 of the stationary wireless battery charging station 150. In another example embodiment, the entire chassis of the mobile robot 105 may be moved upwards or downwards by an elevator mechanism (not shown), under control of the controller 106, as to align the wireless charge receiving pad 111 with the battery charging pad 156 of the stationary wireless battery charging station 150.

An extent of movement and direction of movement (either upwards or downwards) may be determined based on an elevation at which the battery charging pad 156 is provided upon a wall 158. In some cases, the battery charging pad 156 may be located close to the ground (1 foot, for example) while in some other cases, the battery charging pad 156 may be located higher up on the wall 158 (2 feet, for example).

The mobile robot 105 can move towards the stationary wireless battery charging station 150 under control of the controller 106 so as to bring the wireless charge receiving pad 111 within wireless charging range of the battery charging pad 156. The controller 106 may obtain navigation assistance from various sensors (not shown) and devices such as, for example, the onboard camera 113, an infrared sensor, an ultrasonic device, a radar system, a light detection and ranging (LIDAR) system, etc.). More particularly, the onboard camera 113 may provide images in real time (in the form of streaming video, for example). The images may be evaluated by the controller 106 in order to identify a travel path to the stationary wireless battery charging station 150 (and also to identify and avoid obstacles in the travel path).

In an example implementation in accordance with disclosure, a graphical feature may be provided on the battery charging pad 156 (such as, for example, a wireless node logo). In an example operation in accordance with disclosure, the controller 106 may evaluate images provided by the onboard camera 113 to identify the wireless node logo and to move towards the battery charging pad 156 by using the wireless node logo as a destination identifier.

The stationary wireless battery charging station 150 can include a wireless battery charging apparatus 160, which is coupled to the battery charging pad 156. In this example embodiment, the battery charging pad 156 is mounted on a wall plate 155 that also includes an electrical socket 157 that is coupled to a mains voltage (120V AC, 220V AC, etc.). The electrical socket 157 may be used to power various devices including the mobile robot 105, if so desired. In other embodiments, the electrical socket 157 may be omitted.

The wireless battery charging apparatus 160 of the stationary wireless battery charging station 150 may include hardware and/or software configured to produce a wireless battery charge that is made available on the battery charging pad 156. The wireless battery charge may be configured to radiate outwards with respect to a mounting surface (such as the wall 158). The wireless battery charging apparatus 160 may include any of various types of charge generating circuitry including, for example, an inductive coupling circuit and/or a resonant coupling circuit. The inductive coupling circuit may be implemented in the form of a primary coil winding (located in the battery charging pad 156, for example) that induces an electrical charge into a secondary coil winding (located in the wireless charge receiving pad 111 of the mobile robot 105, for example). The resonant coupling circuit may be implemented in the form of a first resonant circuit (located in the battery charging pad 156, for example) that radiates an electrical charge into a second resonant circuit (located in the wireless charge receiving pad 111 of the mobile robot 105, for example). The first resonant circuit can include a first inductive coil coupled to a first capacitor and the second resonant circuit can include a second inductive coil coupled to a second capacitor.

Wireless communications between the mobile robot 105 and the stationary wireless battery charging station 150 may be carried out over a network 170. The network 170 may include any one, or a combination of networks, such as a local area network (LAN), a wide area network (WAN), a telephone network, a cellular network, a cable network, a wireless network, and/or private/public networks such as the Internet. For example, the network 170 may support communication technologies such as Bluetooth®, cellular, near-field communication (NFC), Wi-Fi, Wi-Fi direct, and/or machine-to-machine communication. At least one portion of the network 170 includes a wireless communication link that allows the mobile robot 105 to wirelessly communicate with the stationary wireless battery charging station 150.

Figure 2:
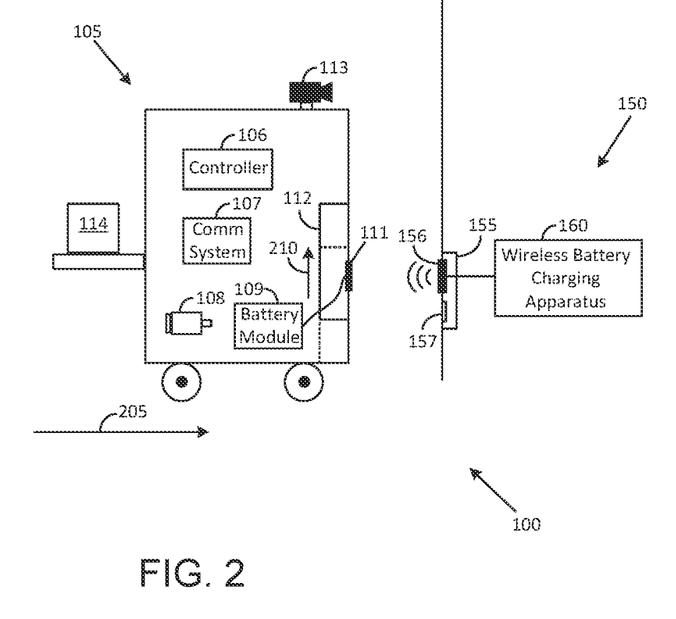
FIG. 2 illustrates the mobile robot executing an example alignment procedure for receiving a wireless charge from the stationary wireless battery charging station in accordance with an embodiment of the disclosure.

FIG. 2 illustrates the mobile robot 105 executing an example alignment procedure for receiving a wireless charge from the stationary wireless battery charging station 150 in accordance with an embodiment of the disclosure. In this example procedure, the mobile robot 105 has traveled along a travel path 205 to reach a spot adjacent to the wall plate 155. The travel path 205 can include segments that are oriented in various x-y axial directions, such as, for example, a segment that is perpendicular with respect the wall 158 and another segment that is at any other angle with respect the wall 158 (10 degrees, 30 degrees, 45 degrees, etc., including parallel to the wall 158). Such travel segments may be necessitated for various reasons, including in order to avoid obstacles if present between a current location of the mobile robot 105 and the wall plate 155.

Upon reaching the spot adjacent to the wall plate 155, the controller 106 may execute an alignment procedure. In an example alignment procedure, the controller 106 may identify the graphical feature provided upon the battery charging pad 156 by evaluating images provided by the onboard camera 113. The controller 106 may then use the graphical feature (the wireless node logo, for example) to align the wireless charge receiving pad 111 of the mobile robot 105 with the battery charging pad 156 of the stationary wireless battery charging station 150. The alignment may be carried out by moving the compartment 112 (and/or the entire chassis of the mobile robot 105) upwards or downwards along the z-axis 210. Furthermore, in an example procedure, the alignment may be carried out by employing a peak power detection routine that is described below in more detail.

In one embodiment, the robot first aligns itself in the Y-direction with the charging pad. The robot then moves along the X-direction towards the charging pad. Next, the robot adjusts the Z location of the receiving pad to achieve alignment with the charging pad.

The mobile robot 105 may establish a wireless handshake with the stationary wireless battery charging station 150 upon completion of the alignment (and/or prior to completion of the alignment). The wireless handshake may be established through communications carried out via the network 170 and/or through direct wireless communications (such as, for example, Wi-Fi communications, near field communications (NFC), and/or radio-frequency identification (RFID) communications). The wireless handshake may be conducted for various reasons such as, for example, to present credentials of the mobile robot 105 to the stationary wireless battery charging station 150. The credentials may be verified by the stationary wireless battery charging station 150 in order to authenticate a wireless charging operation for charging the battery module 109 in the mobile robot 105.

Figure 3:
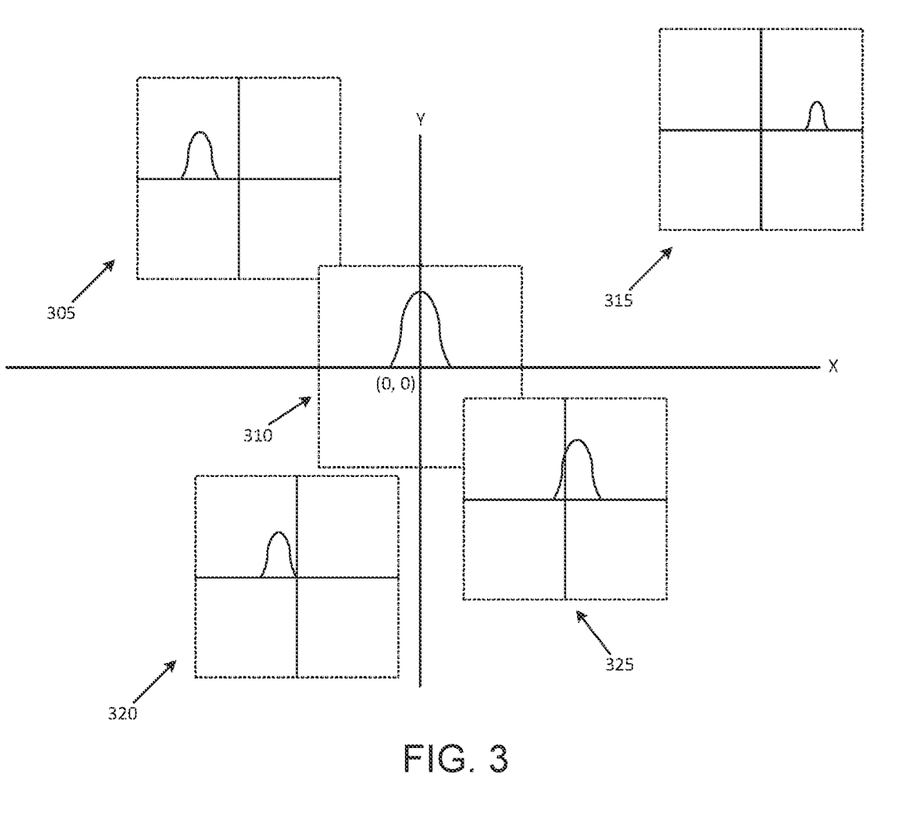
FIG. 3 illustrates some diagrams associated with a peak power detection routine executed by a mobile robot in accordance with an embodiment of the disclosure.

FIG. 3 illustrates some diagrams associated with a peak power detection routine executed by the mobile robot 105 in accordance with an embodiment of the disclosure. In some cases, the peak power detection routine may be executed as a part of an alignment procedure. The diagrams indicate wireless signal power levels at various example locations relative to an x-y coordinate location (0,0). The location (0,0) may correspond to a spot adjacent to the battery charging pad 156 of the stationary wireless battery charging station 150.

The wireless signal power level 310 at the location (0,0) is a peak signal amplitude of a wireless charge transmitted by the stationary wireless battery charging station 150. The wireless signal power level 305 at an example location that is north-west of the location (0,0) is lower than the wireless signal power level 305 at location (0,0). Similarly, each of the wireless signal power level 320 at an example location that is south-west of the location (0,0), the wireless signal power level 315 at an example location that is north-east of the location (0,0), and the wireless signal power level 325 at an example location that is south-east of the location (0,0) is lower than the wireless signal power level 305 at location (0,0).

In one example implementation in accordance with the disclosure, location information of various locations and wireless signal power levels at these various locations (such as, for example, the locations shown in FIG. 3), may be stored in a database of the controller 106. A processor of the controller 106 may use this data to move towards the location (0,0), along any of various travel paths in any of various axial directions that may be defined using (x,y)

coordinates. Upon reaching the location (0,0), the processor of the controller 106 may move the compartment 112 (and/or the chassis of the mobile robot 105) along the z-axis for aligning the wireless charge receiving pad 111 of the mobile robot 105 with the battery charging pad 156 of the stationary wireless battery charging station 150.

Figure 4:
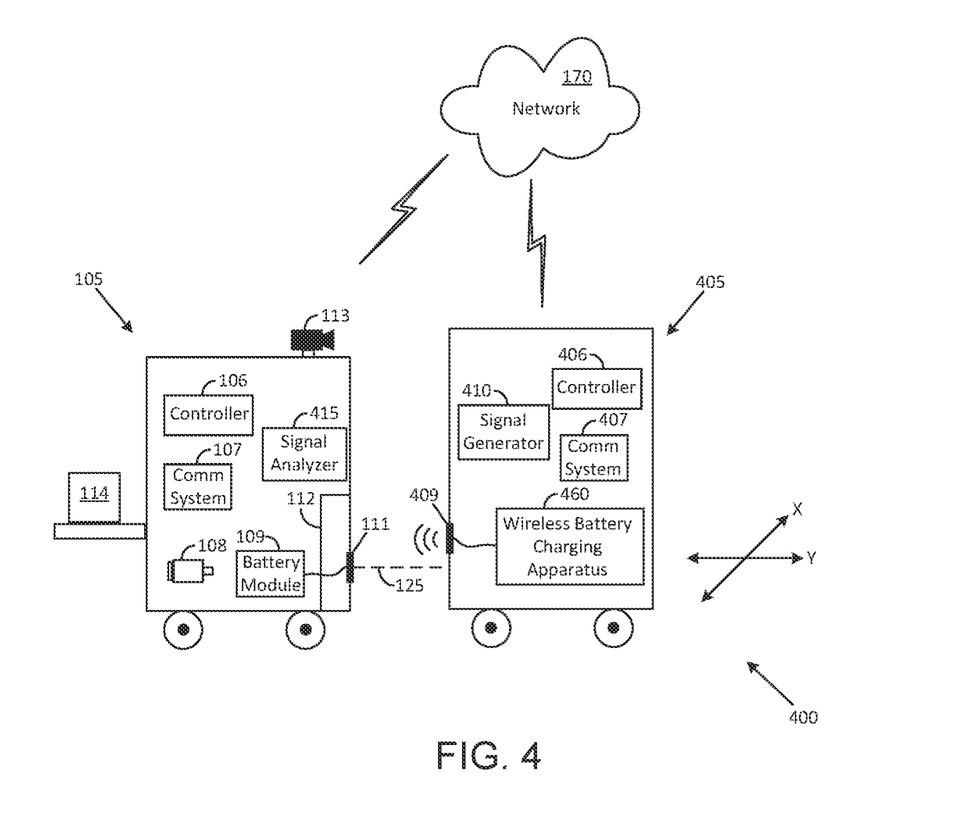
FIG. 4 shows another example system that includes a mobile robot and a mobile wireless battery charging station in accordance with an embodiment of the disclosure.

FIG. 4 shows an example system 400 that includes the mobile robot 105 and a mobile wireless battery charging station 405 in accordance with an embodiment of the disclosure. In this example embodiment, the mobile wireless battery charging station 405 may include a controller 406 (that may be substantially similar to the controller 106 of the mobile robot 105), a communications system 407 (that may be substantially similar to the communications system 107 of the mobile robot 105), and a wireless battery charging apparatus 460 (that may be substantially similar to the wireless battery charging apparatus 160 of the stationary wireless battery charging station 150). The mobile wireless battery charging station 405 may further include a signal generator 410 that is communicatively coupled to the controller 406. The signal generator 410 may also be coupled to the wireless battery charging apparatus 460 for generating a wireless signal under control of the controller 406. The wireless signal may be transmitted out of the mobile wireless battery charging station 405 via a battery charging pad 409.

The mobile robot 105 may include the controller 106, the communication system 107, the motor system 108, the onboard camera 113, and the battery module 109 that are described above. The mobile robot 105 may further include a signal analyzer 415 that is described below in more detail.

In an example operation in accordance with the disclosure, the mobile robot 105 may travel from a current location (for example, from a package drop-off location) to where the mobile wireless battery charging station 405 is currently located (for example, at a warehouse of a package delivery service). The travel procedure and wireless charging procedure can be similar to those described above.

Alternatively, the mobile wireless battery charging station 405 may travel from a current location of the mobile wireless battery charging station 405 (for example, at a storage facility of a package delivery service) to rendezvous with the mobile robot 105 that may be currently located at a different location (for example, at an intermediate point on a travel route to a drop-off location). In this scenario, the mobile wireless battery charging station 405 may maintain wireless contact with the mobile robot 105 via wireless communications conducted via the network 170, in order to identify a rendezvous location, and/or to coordinate a time at which the rendezvous is expected to take place.

The mobile wireless battery charging station 405 may execute a wireless handshake after rendezvousing with the mobile robot 105. In an example implementation, the wireless handshake may be initiated by a physical interaction between the mobile wireless battery charging station 405 and the mobile robot 105. One example of a physical interaction may involve the mobile robot 105 operating an extension arm to depress a button on the mobile wireless battery charging station 405 (or vice-versa). Subsequent operations, such as transmission of a wireless charge by the mobile wireless battery charging station 405 to the mobile robot 105, may also be initiated by a physical interaction between the mobile wireless battery charging station 405 and the mobile robot 105.

Various operations may then be carried out after establishing the wireless handshake. One example operation may involve the mobile robot 105 providing authentication information to the mobile wireless battery charging station 405 and/or, conversely, the mobile wireless battery charging station 405 providing authentication information to the mobile robot 105. Another example operation may involve modifying certain characteristics of the mobile wireless battery charging station 405 and/or the mobile robot 105. In an example implementation, modifying a characteristic of the mobile wireless battery charging station 405 and/or the mobile robot 105 may involve modifying one or more characteristics of a wireless signal generated by the signal generator 410 in the mobile wireless battery charging station 405 and transmitted outwards through the battery charging pad 409.

In some cases, the modifications may be carried out based on information received from the mobile robot 105. The information may be derived in the mobile robot 105 by using a signal analyzer 415 to evaluate one or more wireless signals transmitted by the mobile wireless battery charging station 405. Some example characteristics of a wireless signal that may be evaluated by the signal analyzer 415 may include a frequency, an amplitude, a pulse repetition rate, and/or a radiation pattern.

In some other cases, the modifications may be carried out based on a calibration procedure for calibrating the wireless signal transmitted out of the battery charging pad 409. The calibration procedure may be carried out by the mobile wireless battery charging station 405 interacting with the mobile robot 105. In an example scenario, the controller 406 may configure the signal generator 410 to generate a calibration signal that is transmitted to the mobile robot 105 via the battery charging pad 409. The signal analyzer 415 may analyze the received wireless signal and provide information to the controller 406 of the mobile wireless battery charging station 405 that may be used to modify one or more settings of the signal generator 410.

It must be understood that at least some of the procedures and operations described above with respect to the mobile wireless battery charging station 405 (wireless handshake, calibration, etc.) may be equally applicable to procedures and operations associated with the stationary wireless battery charging station 150.

In some instances, access to the robot-to-charge access locations may be monetized. This would enable a business model for charging access locations (warehouses, apartment buildings, etc.) to charge a rate (e.g. $/time, $/Whr, etc.) to different companies whose robots are charging as individual charge access points. Such rates can differ by company negotiated rates and be implemented/tracked at the handshake/authentication signal via signal generator/analyzer interactions.

Figure 5:
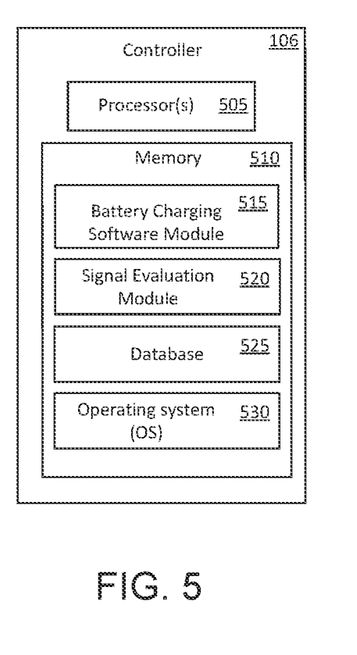
FIG. 5 shows some example components that may be included in a controller of a mobile robot in accordance with an embodiment of the disclosure.

FIG. 5 shows some example components that may be included in the controller 106 of the mobile robot 105 in accordance with an embodiment of the disclosure. The example components may include a processor 505 and a memory 510. The memory 510, which is one example of a non-transitory computer-readable medium, may be used to store a database 525, an operating system (OS) 530, and various code modules such as, for example, a battery charging software module 515 and a signal evaluation module 520. The code modules are provided in the form of computer-executable instructions that can be executed by the processor 505 for performing various operations in accordance with the disclosure.

Figure 7:
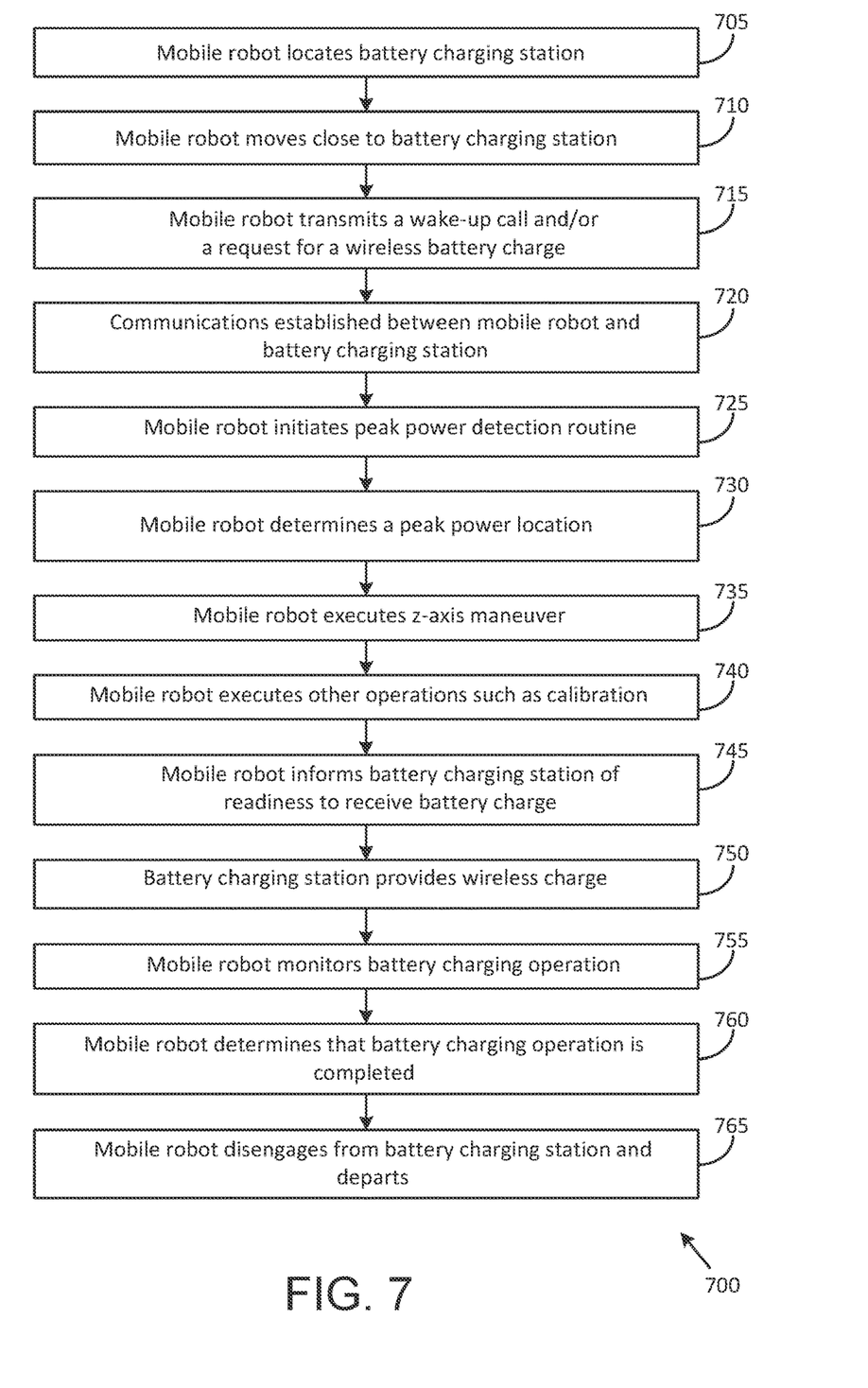
FIG. 7 shows a flowchart of an example method to charge a battery of a mobile robot in accordance with an embodiment of the disclosure.

The battery charging software module 515 may be executed by the processor 505 for performing various operations such as, for example, operations described below in the form of a flowchart that is illustrated in FIG. 7. The signal evaluation module 520 may be executed to evaluate a wireless signal received from the mobile wireless battery charging station 405 for various reasons such as, for example, calibration and modifications, in the manner described above. The database 525 may be used to store various types of information, such as, for example, signal characteristics of one or more wireless signals transmitted by the stationary wireless battery charging station 150 and/or the mobile wireless battery charging station 405, and wireless signal strength and location information associated with the peak power detection routine described above.

Figure 6:
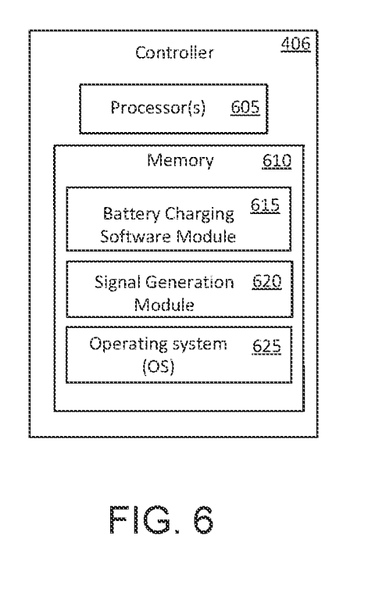
FIG. 6 shows some example components that may be included in a controller of a mobile wireless battery charging station in accordance with an embodiment of the disclosure.

FIG. 6 shows some example components that may be included in the controller 406 of the mobile wireless battery charging station 405 in accordance with an embodiment of the disclosure. The example components may include a processor 605 and a memory 610. The memory 610, which is another example of a non-transitory computer-readable medium, may be used to store an operating system (OS) 625 and various code modules such as, for example, a battery charging software module 615 and a signal generation module 620. The code modules are provided in the form of computer-executable instructions that can be executed by the processor 605 for performing various operations in accordance with the disclosure.

The battery charging software module 615 may be executed by the processor 605 for performing various operations such as, for example, operations described below in the form of a flowchart that is illustrated in FIG. 7. The signal generation module 620 may be executed to generate a wireless signal having a desired set of characteristics. These characteristics may be set, modified, and/or calibrated by the processor 605 based on interactive communications between the mobile wireless battery charging station 405 and the mobile robot 105.

FIG. 7 shows a flowchart 700 of an example method to charge a battery of a mobile robot in accordance with an embodiment of the disclosure. The flowchart 700 illustrates an example sequence of operations that can be implemented in hardware, software, or a combination thereof. In the context of software, the operations represent computer-executable instructions stored on one or more non-transitory computer-readable media such as the memory 510 and the memory 610, that, when executed by one or more processors such as the processor 505 and the processor 605, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be carried out in a different order, omitted, combined in any order, and/or carried out in parallel. Some or all of the operations described in the flowchart 700 may be executed by the battery charging software module 515 in the controller 106 of the mobile robot 105 and/or by the battery charging software module 615 in the controller 406 of the mobile wireless battery charging station 405, individually and/or in cooperation with each other. The operations indicated in the flowchart 700 have been described below by using the system 100 shown in FIG. 1 and the system 400 shown in FIG. 4. However, it must be understood that the flowchart 700 is equally applicable to various other embodiments in accordance with the disclosure.

At block 705, the mobile robot 105 locates the battery charging pad 156 of the stationary wireless battery charging station 150. In one example implementation, the mobile robot 105 may use the communication system 107 to obtain information such as, for example, GPS coordinates of the location of the stationary wireless battery charging station 150 and/or route navigation information, in order to reach the stationary wireless battery charging station 150. The information may be obtained from various sources, such as, for example, from a communication system (not shown) of the stationary wireless battery charging station 150 by using communication formats such as, for example, Wi-Fi communication or cellular communication.

The mobile robot 105 may employ the onboard camera 113 when the stationary wireless battery charging station 150 is within viewing range, in order to identify and locate the graphical feature provided on the battery charging pad 156. In an alternative scenario, the mobile wireless battery charging station 405 may execute a similar maneuver to reach the mobile robot 105. In this case, a graphical feature may be provided upon the wireless charge receiving pad 111 of the mobile robot 105.

At block 710, the mobile robot 105 moves to a location near the stationary wireless battery charging station 150 where communications such as RFID communications or RFID communications can be established.

At block 715, the communication system 107 of the mobile robot 105 may transmit to the stationary wireless battery charging station 150, a wakeup call and/or a request to provide a wireless battery charge.

At block 720, low power communications may be carried out in order to establish optimal wireless battery charge transfer from the stationary wireless battery charging station 150 to the mobile robot 105.

At block 725, the mobile robot 105 initiates a peak power detection routine.

At block 730, the mobile robot 105 may determine a peak power location such as by using the example procedure described above with respect to identifying the location (0,0).

At block 735, the mobile robot 105 performs a z-axis maneuver so as to align the wireless charge receiving pad 111 with the battery charging pad 156 of the stationary wireless battery charging station 150. In one example scenario, the mobile robot 105 may perform a z-axis maneuver upon discovering (via images captured by the onboard camera 113, for example) that the wireless charge receiving pad 111 is not aligned with the battery charging pad 156 and may move the compartment 112 upwards or downwards to execute the alignment. The mobile robot 105 may also move laterally in any of various directions on the x-y plane on as-needed basis in order to perform the alignment.

At block 740, further operations such as, for example, calibrating a wireless charge signal, modifying a wireless charge signal, and/or authenticating the mobile robot 105, may be executed.

At block 745, the mobile robot 105 may inform the stationary wireless battery charging station 150 of a readiness to receive a wireless charge.

At block 750, the stationary wireless battery charging station 150 provides a wireless charge out of the battery charging pad 156.

At block 755, the mobile robot 105 may monitor the charging operation by performing operations such as, for example, using a battery charge level detection circuit to monitor a charge level of the battery module 109 based on a desired charge level and/or a duration of the charging process.

At block 760, the mobile robot 105 determines that charging of the battery module 109 has been completed.

At block 765, the mobile robot 105 disengages from the stationary wireless battery charging station 150 and departs.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize one or more devices that include hardware, such as, for example, one or more processors and system memory, as discussed herein. An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of non-transitory computer-readable media.

Computer-executable instructions comprise, for example, instructions and data which, when executed at a processor, cause the processor to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

A memory device such as the memory 510 or the memory 610, can include any one memory element or a combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory device may incorporate electronic, magnetic, optical, and/or other types of storage media. In the context of this document, a "non-transitory computer-readable medium" can be, for example but not limited to, an electronic, magnetic, optical, electromagnetic, infrared, or semiconductor system, apparatus, or device. More specific examples (a non-exhaustive list) of the computer-readable medium would include the following: a portable computer diskette (magnetic), a random-access memory (RAM) (electronic), a read-only memory (ROM) (electronic), an erasable programmable read-only memory (EPROM, EEPROM, or Flash memory) (electronic), and a portable compact disc read-only memory (CD ROM) (optical). Note that the computer-readable medium could even be paper or another suitable medium upon which the program is printed, since the program can be electronically captured, for instance, via optical scanning of the paper or other medium, then compiled, interpreted or otherwise processed in a suitable manner if necessary, and then stored in a computer memory.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description, and claims refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein for purposes of illustration and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described example embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method comprising:
   locating, by a mobile robot, a wireless battery charging station;
   autonomously traversing, by the mobile robot, using one or more sensors, and along at least one of an x-axis and a y-axis, an environment towards the wireless battery charging station;
   aligning, by the mobile robot, a wireless charge receiving pad of the mobile robot with a battery charging pad of the wireless battery charging station, the aligning comprising moving the wireless charge receiving pad of the mobile robot in one or more of three axial directions to a first position relative to the battery charging pad;
   determining, based on a first wireless signal power level between the mobile robot and the battery charging station, that the mobile robot is at the first position;
   determining that the first wireless signal power level is less than a peak power level at the first position;
   aligning, by the mobile robot, the wireless charge receiving pad to a second position relative to the battery charging pad;
   determining, based on a second wireless signal power level between the mobile robot and the battery charging station, that the mobile robot is at the second position;
   determining that the second wireless signal power level is greater than or equal to the peak power level at the second position;
   establishing, by the mobile robot, a wireless handshake between the mobile robot and the wireless battery charging station; and
   executing, by the mobile robot, a wireless battery charging operation of a battery module in the mobile robot by the wireless battery charging station.

2. The method of claim 1, wherein the wireless handshake comprises a verification of an authentication of the mobile robot to access the wireless battery charging station, and wherein moving the wireless charge receiving pad of the mobile robot in the one or more of three axial directions comprises moving the wireless charge receiving pad laterally with respect to the wireless battery charging station, moving the wireless charge receiving pad vertically with respect to the wireless battery charging station, and/or moving the battery charging pad towards the wireless battery charging station.

3. The method of claim 1, wherein locating the battery charging pad of the wireless battery charging station comprises operating a camera provided in the mobile robot.

4. The method of claim 3, wherein locating the battery charging pad of the wireless battery charging station comprises identifying a graphical feature provided on the battery charging pad of the wireless battery charging station, and wherein aligning the wireless charge receiving pad of the mobile robot with the battery charging pad of the wireless battery charging station comprises processing one or more images captured by the camera.

5. The method of claim 2, wherein establishing the wireless handshake between the mobile robot and the wireless battery charging station comprises operating a radio-frequency identification (RFID) system provided in the mobile robot.

6. A system comprising:
   a wireless battery charging station comprising a battery charging pad; and
   a mobile robot, the mobile robot comprising:
      a battery module connected to a wireless charge receiving pad;
      a motor system operable to:
         move the wireless charge receiving pad in the mobile robot in one or more of three axial directions for aligning the wireless charge receiving pad with the battery charging pad of the wireless battery charging station; and
         autonomously traverse, using one or more sensors, and along at least one of an x-axis and a y-axis, an environment towards the wireless battery charging station; and
      a controller system configured to:
         determine, based on a first wireless signal power level between the mobile robot and the wireless battery charging station, that the mobile robot is at a first position relative to the wireless battery charging station;
         determine that the first wireless signal power level is less than a peak power level at the first position;
         align the wireless charge receiving pad to a second position relative to the battery charging pad;
         determine, based on a second wireless signal power level between the mobile robot and the wireless battery charging station, that the mobile robot is at the second position;
         determine that the second wireless signal power level is greater than or equal to the peak power level at the second position; and
         establish a wireless handshake between the mobile robot and the wireless battery charging station and execute a wireless battery charging operation of the battery module by the wireless battery charging station.

7. The system of claim 6, wherein the motor system is operable to move the wireless charge receiving pad laterally with respect to the wireless battery charging station, move the wireless charge receiving pad vertically with respect to the wireless battery charging station, and/or move the battery charging pad towards the wireless battery charging station.

8. The system of claim 6, wherein the wireless battery charging station is one of a stationary wireless battery charging station or a mobile wireless battery charging station.

9. The system of claim 8, wherein the mobile robot further includes a camera, and wherein the controller system is configured to one of move the mobile robot to the stationary wireless battery charging station or to rendezvous with the mobile wireless battery charging station, based on evaluating one or more images provided by the camera.

10. The system of claim 6, wherein the mobile robot further includes a radio-frequency identification (RFID) system, and wherein the controller system is configured to operate the RFID system to establish the wireless handshake between the mobile robot and the wireless battery charging station.

11. The system of claim 6, wherein the wireless charge receiving pad of the mobile robot is coupled to a first inductive element, and wherein the battery charging pad of the wireless battery charging station is coupled to a second inductive element, and further wherein the wireless battery charging operation of the battery module includes an inductive wireless charge transfer from the second inductive element to the first inductive element.

12. The system of claim 6, wherein the wireless charge receiving pad of the mobile robot is coupled to a first resonant circuit, and wherein the battery charging pad of the wireless battery charging station is coupled to a second resonant circuit, and further wherein the wireless battery charging operation of the battery module includes an inductive wireless charge transfer from the second resonant circuit to the first resonant circuit.

13. A mobile robot that includes a controller system, the controller system comprising:
a memory that stores computer-executable instructions; and
a processor configured to access the memory and execute the computer-executable instructions to at least:
locating a wireless battery charging station;
autonomously traverse, using one or more sensors and along at least one of an x-axis and a y-axis, an environment towards the wireless battery charging station;
align a wireless charge receiving pad of the mobile robot with a battery charging pad of a wireless battery charging station by moving the wireless charge receiving pad of the mobile robot in one or more of three axial directions to a first position relative to the battery charging pad;
determine, based on a first wireless signal power level between the mobile robot and the wireless battery charging station, that the mobile robot is at the first position;
determine that the first wireless signal power level is less than a peak power level at the first position;
align, by the mobile robot, the wireless charge receiving pad to a second position relative to the battery charging pad;
determine, based on a second wireless signal power level between the mobile robot and the wireless battery charging station, that the mobile robot is at the second position;
determine that the second wireless signal power level is greater than or equal to the peak power level at the second position;
establish a wireless handshake between the mobile robot and the wireless battery charging station; and
execute a wireless battery charging operation of a battery module in the mobile robot by the wireless battery charging station.

14. The mobile robot of claim 13, further comprising:
a motor system operable under control of the controller system to move the wireless charge receiving pad of the mobile robot in the one or more of three axial directions.

15. The mobile robot of claim 13, wherein moving the wireless charge receiving pad of the mobile robot in the one or more of three axial directions comprises moving the wireless charge receiving pad laterally with respect to the wireless battery charging station, moving the wireless charge receiving pad vertically with respect to the wireless battery charging station, and/or moving the battery charging pad towards the wireless battery charging station.

16. The mobile robot of claim 15, wherein aligning the wireless charge receiving pad of the mobile robot with the battery charging pad of the wireless battery charging station comprises determining that an amplitude of a wireless signal power level between the wireless charge receiving pad and the battery charging pad is a peak value, wherein the peak value indicates that the wireless charge receiving pad is adjacent to the battery charging pad.

17. The mobile robot of claim 13, further comprising:
a camera operable under control of the controller system to locate the wireless battery charging station by identifying a graphical feature provided on the battery charging pad of the wireless battery charging station.

18. The mobile robot of claim 17, wherein the wireless battery charging station is one of a stationary wireless battery charging station or a mobile wireless battery charging station, and wherein the controller system is configured to one of move to the stationary wireless battery charging station or to rendezvous with the mobile wireless battery charging station, based on evaluating one or more images provided by the camera.

19. The mobile robot of claim 13, further comprising:
a radio-frequency identification (RFID) system operable under control of the controller system to establish the wireless handshake between the mobile robot and the wireless battery charging station.

* * * * *